Jan. 11, 1955    R. R. ALLEN ET AL    2,699,289
HIGH-SPEED CENTRIFUGE
Filed Sept. 2, 1950
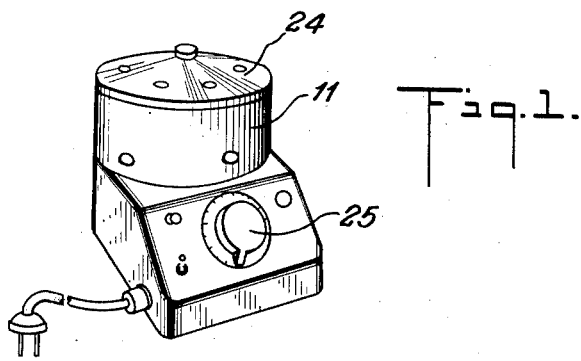
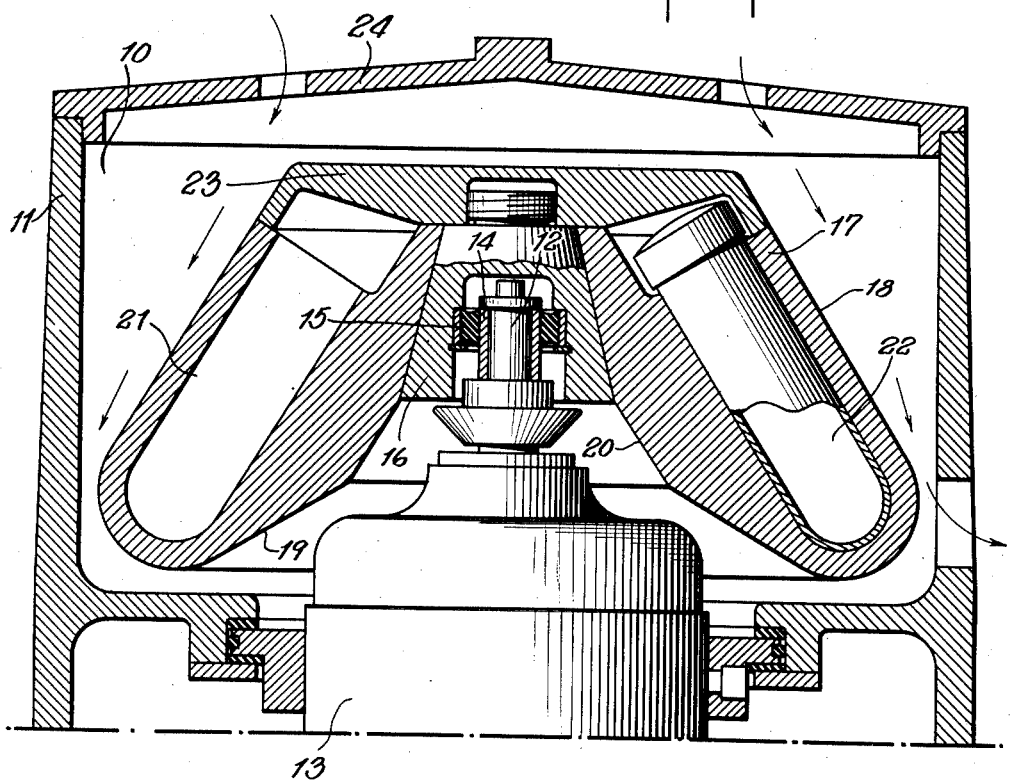
INVENTOR.
ROBERT R. ALLEN
BY ROBERT J. NOVOTNY
Benj. T. Rauber
ATTORNEY

United States Patent Office 2,699,289
Patented Jan. 11, 1955

2,699,289

HIGH-SPEED CENTRIFUGE

Robert R. Allen, Arlington, and Robert J. Novotny, Irvington, N. J., assignors to Custom Scientific Instruments, Inc., Arlington, N. J., a corporation of New Jersey Application September 2, 1950, Serial No. 183,054

8 Claims. (Cl. 233—26)

Our present invention relates to a high speed centrifuge, particularly one driven at a speed of several thousand revolutions per minute, as for example, speeds up to 20,000 R. P. M. or more, for the separation of very fine suspensions.

High speed centrifuges of this type are used primarily for laboratory work or in biochemical or medical research.

In centrifuges run at such high speeds any lack of balance in the rotor would cause a very serious, dangerous or destructive vibration.

In using the centrifuge, test tubes are filled to approximately equal amounts and then placed in the rotor in symmetrical or balanced relation to the axis of rotation. Inasmuch as the test tubes may vary in weight and in dimensions, and as they are not filled with sufficient accuracy to balance perfectly, it is practically impossible to insure a perfect balancing of the rotor when loaded.

Our present invention provides a high speed centrifuge in which the rotor is self aligning at the speeds at which the centrifuge is operated thereby obviating the vibrational effects of unequal balance of the loaded rotor.

In our present invention we provide a resilient flexible bushing between the rotor supporting hub and the supporting and rotating spindle on which it is mounted. The rotor is removably mounted on the hub and is of a hollow frusto-conical shape extending downwardly and outwardly below the hub and contains a number of pairs of diametrically opposite pockets or recesses which also extend downwardly and outwardly to receive test tubes and specimens of the material to be subjected to the centrifuging.

When thus loaded and the rotor rotated at a high speed, the rotor adapts itself to rotation about its center of gravity (through a gyroscopic action) and at these high speeds rotates smoothly and without appreciable vibration. The resilient flexible coupling between the rotor hub and the rotating spindle enables this adjustment of the rotor to be attained.

The rotor and its supporting hub and spindle are preferably mounted immediately above the driving motor so that a circulating current of air is directed upwardly against the hub to then flow downwardly and outwardly providing a cooling current of air, tending to maintain the rotor at a constant temperature.

The hub is of frusto-conical shape, and the rotor has a recess complementary thereto so that it may be lifted from the hub and replaced by another rotor for treatment of samples in test tubes of different sizes. To prevent breakage test tubes of metal or of a flexible material are generally employed.

The various features of the invention are illustrated, by way of example, in the accompanying drawings in which Fig. 1 is a perspective view of the centrifuge of our invention, and Fig. 2 is a vertical section thereof.

In the embodiment of the invention illustrated in the accompanying drawings, the rotor is contained within a chamber 10 in the upper part of a suitable housing or casing 11 and supported on a spindle 12 of a high speed motor 13. The upper end of the spindle carries a collar 14 on which is secured a coupling 15 of flexible resilient material, such as vulcanized rubber. The spindle 12 projects into a recess in a supporting frusto conical hub 16, the recess being of larger diameter than the diameter of the spindle to form an annular space which is spanned by the coupling 15. The coupling 15 in turn supports the frusto-conical rotor supporting hub 16. The coupling is of annular construction the end faces of which are grooved or hollowed out to give greater flexibility or resilience thereto.

The outer surface of the hub 16 is frusto-conical in shape to be received in a frusto-conical recess centered in a rotor 17 which fits onto the hub 16 with sufficient frictional engagement to prevent substantial slippage, but may be lifted therefrom for replacement. As shown in the drawings, the hub and rotor are supported solely by the spindle 12 and resilient, flexible, coupling 15. The flexibility and resiliency of the coupling 15 permit the hub and rotor to rotate about the center of gravity of the assembled hub and loaded rotor independently of the axis of rotation of the spindle.

The rotor 17 is of frusto-conical shape, the outer surface 18 sloping downwardly and outwardly. The rotor is recessed upwardly and inwardly as at 19 and 20 to that part at its upper end which sets upon and fits the hub 16.

Between the outer surface of the rotor and the recessed inner surfaces the rotor is provided with downwardly and outwardly sloping recesses 21 cylindrical in shape and rounded at their lower ends to approximately the shape of a test tube 22, to be placed therein. The upper end of the rotor may be covered by means of a cap 23 prior to rotation. The cap 23 may be removably secured to the hub 16 by means of a threaded stud to which a tapped recess in the cap may be screwed as shown in Fig. 2.

The chamber 10 at the upper end of the supporting casing is also provided with a cover or lid 24.

It may be noted that currents of air blown upwardly through the motor would be directed toward the hub 16 and then flow downwardly and outwardly through ports provided in housing 11, providing a cooling effect for the rotor, hub and flexible coupling. In cover 24 there are also provided ports to aid the air circulation along the side of the rotor as indicated by directional arrows in Fig. 2, providing a cooling effect for the rotor, hub and flexible coupling.

When the motor 13 is operated at a high speed the rotor adjusts itself in the flexible coupling relative to the axis of the spindle or shaft 12 of the motor so as to rotate about its true center of gravity when loaded. Any slight divergence in the axis of rotation of the rotor and the axis of rotation of the spindle 12 will be absorbed in the flexible coupling 15 so that the rotor will run smoothly and without vibration at the highest speed.

The rotor may, for example, be run normally at 13,500 R. P. M. but may, if desired, operate at higher speeds, for example at 20,000 R. P. M., or at lower speeds. For this purpose the motor 13 is a variable speed motor controlled by a suitable knob 25 on the casing 11. Inasmuch as the rotor adjusts itself to its true center of gravity in approaching the operational speeds thus eliminating vibration, the centrifuge may be run at speeds which would otherwise be very troublesome or dangerous.

Having described our invention, what we claim is:

1. A high speed centrifuge which comprises a rotatable, vertical, spindle, a rotor hub having a recess extending axially upwardly and coaxially receiving the upper end of said spindle, said recess being of larger diameter than the diameter of said spindle to form an annular space in said recess about said spindle, a resilient, flexible, supporting member for said hub within and spanning the annular space between said spindle and the inner wall of said recess and supporting said hub on said spindle and a rotor mounted on and supported solely by said hub, said rotor having loading recesses therein arranged symmetrically about the axis of the hub and inclined upwardly and inwardly.

2. The centrifuge of claim 1 in which the hub is frusto-conical in shape and the rotor is hollow and frusto-conical in shape and has a bearing recess at its upper end to receive and fit said hub.

3. The centrifuge of claim 1 having a cap removably secured on said hub and covering the upper part of said rotor.

4. A mounting for a high speed centrifuge which comprises a rotating vertical spindle, a rotor hub having a recess extending axially upwardly and coaxially receiving the upper end of said spindle, said recess being of larger diameter than the diameter of said spindle to form an annular space in said recess about said upper end of said spindle, a resilient, flexible, supporting member for said hub within and spanning the annular space between said spindle and the enclosing surface of said recess, and a rotor mounted on and freely supported solely by said hub.

5. The centrifuge mounting of claim 4 in which said supporting member is cylindrical.

6. The centrifuge mounting of claim 4 in which said supporting member is cylindrical and has hollowed end faces.

7. The centrifuge of claim 6 in which said supporting member is of vulcanized rubber.

8. A high speed centrifuge which comprises a casing having a motor in its lower part and having an enclosing wall extending above said motor, said motor having a rotating spindle extending upwardly within said enclosing wall, a rotor hub having a recess into which the end of said spindle projects, said recess being of larger diameter than said spindle and concentric therewith to form an annular space about said spindle, a resilient, flexible, supporting member for said hub within said recess and spanning the annular space between said spindle and the inner surface of said recess about said spindle to support said hub on said spindle, a rotor mounted on and rotatable with said hub about an axis independent of the axis of rotation of said spindle and having loading recesses arranged symmetrically about the axis of said rotor and inclinded upwardly and inwardly, and a cap secured to said hub and covering the upper part of said rotor.

References Cited in the file of this patent

UNITED STATES PATENTS

| Number | Name | Date |
|---|---|---|
| 581,205 | Hewitt | Apr. 20, 1897 |
| 650,527 | Eggeman | May 29, 1900 |
| 996,776 | Lawson | July 4, 1911 |
| 1,242,866 | Riggs | Oct. 9, 1917 |
| 1,483,326 | Bock | Feb. 12, 1924 |
| 1,495,933 | Swancara | May 27, 1924 |
| 2,202,157 | Levy | May 28, 1940 |
| 2,265,053 | Anderson | Dec. 2, 1941 |
| 2,447,330 | Greb Meier | Aug. 17, 1948 |
| 2,463,801 | Page | Mar. 8, 1949 |
| 2,507,309 | Larson | May 9, 1950 |

FOREIGN PATENTS

| Number | Country | Date |
|---|---|---|
| 15,422 | Great Britain | of 1901 |
| 371,777 | Germany | Mar. 21, 1923 |
| 716,873 | Germany | Jan. 30, 1942 |